United States Patent
Nishi

(10) Patent No.: US 8,897,603 B2
(45) Date of Patent: Nov. 25, 2014

(54) IMAGE PROCESSING APPARATUS THAT SELECTS A PLURALITY OF VIDEO FRAMES AND CREATES AN IMAGE BASED ON A PLURALITY OF IMAGES EXTRACTED AND SELECTED FROM THE FRAMES

(75) Inventor: Takeshi Nishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 509 days.

(21) Appl. No.: 12/860,324

(22) Filed: Aug. 20, 2010

(65) Prior Publication Data

US 2011/0182512 A1    Jul. 28, 2011

(30) Foreign Application Priority Data

Aug. 20, 2009  (JP) ................. 2009-191310
Aug. 17, 2010  (JP) ................. 2010-182301

(51) Int. Cl.
| | |
|---|---|
| *G06K 9/00* | (2006.01) |
| *G11B 27/10* | (2006.01) |
| *G06F 17/30* | (2006.01) |
| *G11B 27/34* | (2006.01) |

(52) U.S. Cl.
CPC ........ *G11B 27/105* (2013.01); *G06F 17/30843* (2013.01); *G11B 27/34* (2013.01)
USPC .................... 382/305; 707/E17.028; 386/241

(58) Field of Classification Search
CPC ........... G06K 9/00751; G06K 9/00744; G06F 17/30843
See application file for complete search history.

(56) References Cited

U.S. PATENT DOCUMENTS

| | | | | |
|---|---|---|---|---|
| 6,549,643 | B1 * | 4/2003 | Toklu et al. ................. | 382/107 |
| 7,532,771 | B2 * | 5/2009 | Taylor et al. ................ | 382/284 |
| 7,647,555 | B1 * | 1/2010 | Wilcox et al. ............... | 715/721 |
| 7,689,909 | B1 * | 3/2010 | Szuszczewicz ............ | 715/243 |
| 8,102,406 | B2 * | 1/2012 | Peleg et al. ................. | 345/629 |
| 2003/0068087 | A1 * | 4/2003 | Wu et al. .................... | 382/190 |
| 2003/0210886 | A1 * | 11/2003 | Li et al. ....................... | 386/46 |
| 2006/0117356 | A1 * | 6/2006 | Jojic et al. .................... | 725/88 |
| 2007/0162873 | A1 * | 7/2007 | Haro et al. .................. | 715/838 |
| 2007/0237421 | A1 * | 10/2007 | Luo et al. .................... | 382/284 |
| 2008/0205789 | A1 * | 8/2008 | Ten Kate et al. ........... | 382/284 |
| 2009/0316989 | A1 * | 12/2009 | Barbieri et al. ............ | 382/173 |
| 2010/0011297 | A1 * | 1/2010 | Tsai et al. .................... | 715/721 |

FOREIGN PATENT DOCUMENTS

| | | |
|---|---|---|
| JP | A-2001-142453 | 5/2001 |
| JP | A-2003-198902 | 7/2003 |
| JP | A-2008-187267 | 8/2008 |
| JP | A-2008-294938 | 12/2008 |
| JP | A-2009-88836 | 4/2009 |

(Continued)

OTHER PUBLICATIONS

Abdel-Mottaleb et al. (Jun. 2004) "Content-based photo album management using faces' arrangement." Proc. 2004 IEEE Int'l Conf. on Multimedia and Expo, vol. 3 pp. 2071-2074.*

(Continued)

*Primary Examiner* — Barry Drennan
(74) *Attorney, Agent, or Firm* — Oliff PLC

(57) ABSTRACT

An image processing apparatus includes a selection device that selects a plurality of frames from a video image constituted with a group of frames, an extraction device that recognizes a specific subject image in the plurality of frames having been selected and extracts the recognized subject image, and an image creation device that creates a still image containing a plurality of subject images having been extracted by the extraction device.

15 Claims, 13 Drawing Sheets

(56) References Cited

FOREIGN PATENT DOCUMENTS

| | | |
|---|---|---|
| JP | A-2010-161644 | 7/2010 |
| WO | WO 2009/060507 A1 | 5/2009 |

OTHER PUBLICATIONS

Aner et al. (2002) "Video summaries through mosaic-based shot and scene clustering." LNCS vol. 2353, pp. 388-402.*

Chiu et al. (Jun. 2004) "Stained-glass visualization for highly condensed video summaries." Proc. 2004 IEEE Int'l Conf. on Multimedia and Expo. vol. 3 pp. 2059-2062.*

Girgensohn et al. (Oct. 2004) "Stained glass photo collages." Proc. IEEE Int'l Conf. on Image Processing, vol. 2 pp. 871-874.*

Hudson et al. (1996) "Techniques for Addressing Fundamental Privacy and Disruption Tradeoffs in Awareness Support Systems." Proc. 1996 ACM Conf. on Computer Supported Cooperative Work, pp. 248-257.*

Notification of Reasons for Refusal dated Jul. 5, 2011 in Japanese Patent Application No. 2010-182301 (with translation).

Aug. 16, 2011 Office Action issued in Japanese Patent Application No. 2009-191310 (with translation).

* cited by examiner

IMAGE PROCESSING APPARATUS THAT SELECTS A PLURALITY OF VIDEO FRAMES AND CREATES AN IMAGE BASED ON A PLURALITY OF IMAGES EXTRACTED AND SELECTED FROM THE FRAMES

INCORPORATION BY REFERENCE

The disclosures of the following priority applications are herein incorporated by reference:

Japanese Patent Application No. 2009-191310 filed Aug. 20, 2009

Japanese Patent Application No. 2010-182301 filed Aug. 17, 2010

BACKGROUND OF THE INVENTION

1. Field of the Invention

The present invention relates to an image processing apparatus and an image processing program.

2. Description of Related Art

It is a standard practice to bring up a plurality of still images recorded in a recording medium on display as thumbnail images so as to enable the user to visually check the contents of the recording medium. When providing a similar display for a video image, which is normally made up with numerous-image frames, it is crucial to select the optimal frame to be used as a thumbnail image. Japanese Laid Open Patent Publication No. 2008-294938 discloses a content recording/reproducing device that creates a plurality of sets of thumbnail data in correspondence to a single set of recorded content data. This content recording/reproducing device displays on the screen the plurality of sets of thumbnail data having been created as thumbnail candidates and designates a specific set of thumbnail data selected by the user as a representative thumbnail.

SUMMARY OF THE INVENTION

Since each thumbnail image corresponds to a single frame, it is difficult to determine the overall contents of the video image based upon any given thumbnail image in the art taught in the publication mentioned above.

An image processing apparatus according to a first aspect of the present invention comprises: a selection device that selects a plurality of frames from a video image constituted with a group of frames; an extraction device that recognizes a specific subject image in the plurality of frames having been selected and extracts the recognized subject image; and an image creation device that creates a still image containing a plurality of subject images having been extracted by the extraction device.

According to a second aspect of the present invention, in the image processing apparatus according to the first aspect, it is preferable that, if a plurality of subject images having been recognized in the plurality of frames are images of a single subject, the extraction device extracts only one of the plurality of subject images.

According to a third aspect of the present invention, in the image processing apparatus according to the first aspect, the image creation device may create a still image with a background thereof constituted with a background image created based upon at least one of the frames in the video image.

According to a fourth aspect of the present invention, in the image processing apparatus according to the third aspect, it is preferable that the background image is a panoramic image created based upon the plurality of frames included in the video image.

A computer-readable computer program product according to a fifth aspect of the present invention includes an image processing program, with the image processing program comprising: a selection step in which a plurality of frames are selected from a video image constituted with a group of frames; an extraction step in which a specific subject image is recognized in the plurality of frames having been selected and the recognized specific subject image is extracted; and an image creation step in which a still image containing a plurality of subject images having been extracted through the extraction step is created.

According to a sixth aspect of the present invention, in the computer-readable computer program product according to the fifth aspect, it is preferable that, if a plurality of subject images having been recognized in the plurality of frames are images of a single subject, only one of the plurality of subject images is extracted in the extraction step.

According to a seventh aspect of the present invention, in the computer-readable computer program product according to the fifth aspect, the single still image may be created in the image creation step by using a background image created based upon at least one of the frames in the video image as a background thereof.

According to a eighth aspect of the present invention, in the computer-readable computer program product according to the seventh aspect, it is preferable that the background image is a panoramic image created based upon the plurality of frames included in the video image.

An image processing apparatus according to a ninth aspect of the present invention comprises: a selection device that selects a plurality of frames from a video image constituted with a group of frames; an extraction device that recognizes a specific subject image in the plurality of frames having been selected and extracts the recognized subject image; a priority ranking setting device that sets priority rankings for a plurality of subject images having been recognized by the extraction device; and an image creation device that creates a still image containing a plurality of subject images having been extracted by arranging the plurality of subject images having been extracted by the extraction device at positions determined based upon the priority rankings.

According to a tenth aspect of the present invention, in the image processing apparatus according to the ninth aspect, it is preferable that the image creation device determines at least one of a relative size to be assumed by each subject image within the still image and a position at which the subject image is to be set within the still image based upon the priority rankings.

According to a eleventh aspect of the present invention, the image processing apparatus according to the ninth aspect may further comprise a decision device that makes a decision for each of a plurality of subject images having been recognized by the extraction device as to whether or not the subject image is to be included in the still image, wherein: the image creation device may create the still image that does not contain any subject image for which a negative decision has been made by the decision device.

According to a twelfth aspect of the present invention, in the image processing apparatus according to the ninth aspect, it is preferable that, if a plurality of subject images having been recognized in the plurality of frames by the extraction device are images of a single subject, the image creation device includes only one of the plurality of subject images in the still image.

According to a thirteenth aspect of the present invention, in the image processing apparatus according to the twelfth aspect, the decision device may make a decision for each of the plurality of subject images having been recognized by the extraction device as to whether or not to include the subject image in the still image based upon at least one of; a number of scenes containing images of a common subject identical to the subject of the subject image, a size of the subject image, and a focus level achieved for the subject image.

According to a fourteenth aspect of the present invention, in the image processing apparatus according to the twelfth aspect, it is preferable that the priority ranking setting device sets the priority rankings for the plurality of subject images having been recognized by the extraction device based upon at least one of a number of scenes containing images of a common subject identical to the subject of the subject image, a size of the subject image, and a focus level achieved for the subject image.

According to a fifteenth aspect of the present invention, the image processing apparatus according to the ninth aspect may further comprise a scene determining device that determines a scene category for each of the plurality of frames having been selected, wherein: the priority ranking setting device may set a priority ranking for each subject image among the plurality of subject images having been recognized by the extraction device, based upon the scene category determined by the scene determining device in correspondence to a frame in which the subject image has been recognized.

According to a sixteenth aspect of the present invention, the image processing apparatus according to the fifteenth aspect may further comprise a categorization device that categorizes the plurality of subject images having been recognized by the extraction device, into a plurality of groups, wherein: the image creation device may create the still image based upon the plurality of groups into which the plurality of subject images have been categorized.

According to a seventeenth aspect of the present invention, the image processing apparatus according to the sixteenth aspect may further comprise an area dividing device that divides an entire area of the still image into areas each corresponding to one of the plurality of groups, wherein: the image creation device may create the still image by setting subject images belonging to each of the plurality of groups in an area corresponding to the group.

According to a eighteenth aspect of the present invention, in the image processing apparatus according to the sixteenth aspect, the image creation device may create a plurality of still images each in correspondence to one of the plurality of groups.

According to a nineteenth aspect of the present invention, in the image processing apparatus according to the sixteenth aspect of the present invention, it is preferable that the categorization device categorizes the plurality of subject images having been recognized by the extraction device, into the plurality of groups based upon at least one of; a type of each subject image, a position of a frame in which the subject image has been recognized, assumed on a time axis of the video image, and the scene category determined for the frame by the scene determining device.

A computer-readable computer program product according to a twentieth aspect of the present invention includes an image processing program, with the image processing program comprising: a selection step in which a plurality of frames are selected from a video image constituted with a group of frames; an extraction step in which a specific subject image is recognized in the plurality of frames having been selected and the recognized specific subject image is extracted; a priority ranking setting step in which priority rankings are set for the plurality of subject images having been extracted through the extraction step; and an image creation step in which a still image containing the plurality of subject images having been extracted through the extraction step is created by arranging the plurality of extracted subject images at positions based upon the priority rankings.

DESCRIPTION OF PREFERRED EMBODIMENTS

First Embodiment

Figure 1:
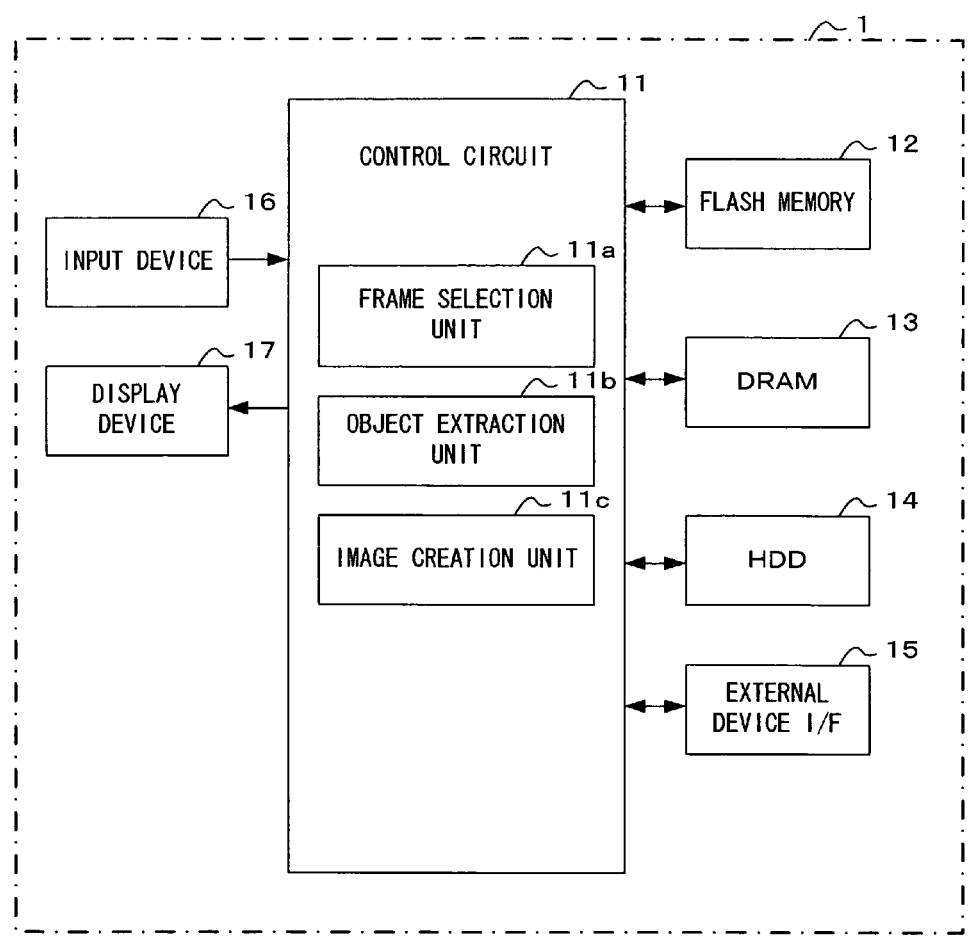
FIG. 1 is a block diagram showing the circuit structure adopted in the image processing apparatus achieved in a first embodiment.

FIG. 1 is a block diagram of the circuit structure adopted in the image processing apparatus achieved in the first embodiment of the present invention. The image processing apparatus 1 includes a control circuit 11, a flash memory 12, a DRAM 13, a hard disk drive (HDD) 14, an external device interface (I/F) 15, an input device 16 and a display device 17. In the flash memory 12, a specific control program to be executed by the control circuit 11 is stored. In the DRAM 13, data to be used by the control program are temporarily stored. In the HDD, a plurality of video image files are stored.

The external device I/F 15 is an interface via which an external device such as a digital camera is connected. The user of the image processing apparatus 1 may connect a digital camera to, for instance, the external device I/F 15 in order to take into the HDD 14 a video image file containing a video image having been shot with the digital camera. The input device 16 includes various types of input devices such as a keyboard and a mouse. The input device 16 outputs an operation signal to the control circuit 11 in response to a user operation. The display device 17 may be any of various types of display devices such as a liquid crystal monitor.

The control circuit 11 includes a frame selection unit 11a, an object extraction unit 11b and an image creation unit 11c. These functional units are achieved in software as the control circuit 11 executes the specific control program stored in the flash memory 12. However, the functional units may each be constituted as an electronic circuit included in the control circuit 11.

Next, an at-a-glance display function of the image processing apparatus 1, which allows the image processing apparatus 1 to provide a display of an at-a-glance list of video image files, is described. The control circuit 11 has a function of displaying an at-a-glance list of the plurality of video image files stored in the HDD 14 and a playback function for reproducing video image files. The video image file at-a-glance display function allows still images (hereafter referred to as representative images), each corresponding to one of the video image files, to be displayed as thumbnails. As the user selects one of the representative images in the thumbnail display, the control circuit 11 starts playing the video image file corresponding to the selected representative image.

The image processing apparatus 1 in the embodiment is capable of executing two different types of processing when creating representative images. In the following description, the two different types of processing are referred to as object combine processing and best-shot combine processing. When providing the video image file at-a-glance display, the control circuit 11 executes either of the two types of processing for each of the video image files stored in the HDD 14.

(Object Combine Processing)

Figure 2A:
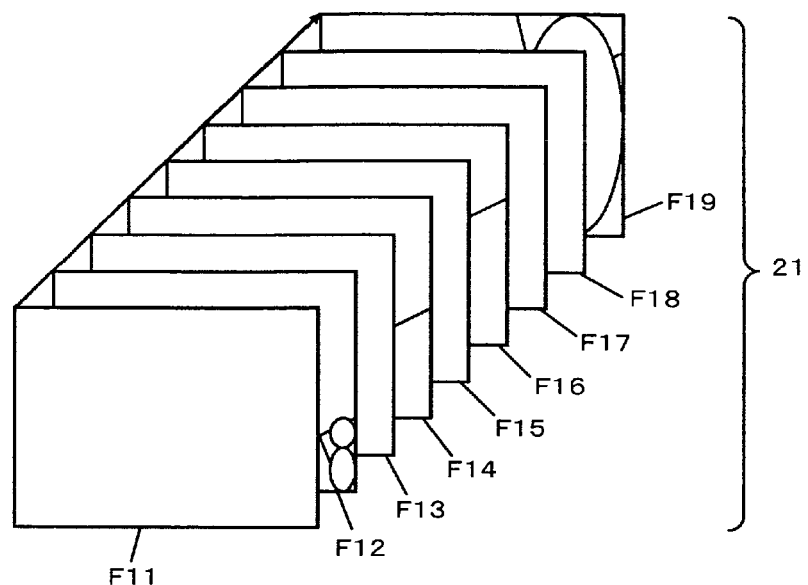
FIGS. 2A to 2C illustrate the procedure through which a thumbnail image is created through object combine processing.
Figure 2B:
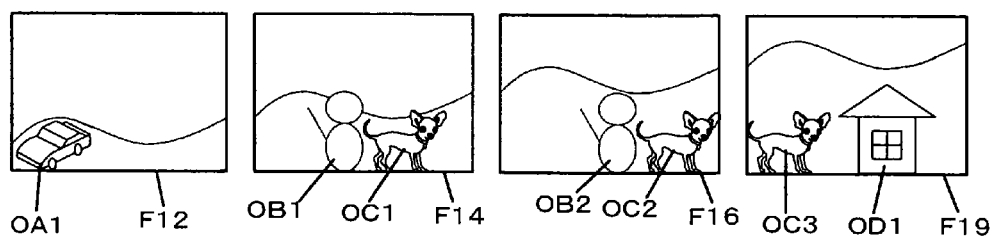
Figure 2C:
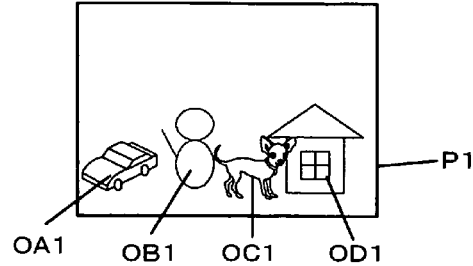

FIGS. 2A to 2C illustrate the procedure through which a representative image is created through the object combine processing. FIG. 2A shows a video image file 21 to undergo the object combine processing described below. The video image file 21 is constituted with a plurality of frames F11 to F19.

In the object combine processing, the frame selection unit 11a selects frames to be designated as object combine processing targets from the frames F11 to F19. The frame selection unit 11a may select all the frames in the video image file 21 or may select a frame out of each group of several consecutive frames. In addition, a frame may be selected by factoring in a scene change that may be detected or the like. FIG. 2B shows four frames F12, F14, F16 and F19 selected by the frame selection unit 11a as object combine processing targets.

Next, the object extraction unit 11b recognizes objects in the four frames having been selected by the frame selection unit 11a. The term "object" is used in the description of the present invention to refer to an image of a certain type of subject contained in a given frame, such as a person, a vehicle or a building. An object can be recognized by adopting a technology of the known art such as pattern matching. In the example presented in FIG. 2B, a vehicle object OA1 is recognized in the frame F12, a human object OB1 and a dog object OC1 are recognized in the frame F14, a human object OB2 and a dog object OC2 are recognized in the frame F16 and a dog object OC3 and a house object OD1 are recognized in the frame F19.

Once these objects are recognized, the object extraction unit 11b executes correspondence decision-making for the objects. A video image file created by shooting 30 image frames per second with a digital camera, for instance, may include a plurality of consecutive frames in which a given subject repeatedly appears. The object extraction unit 11b makes a decision as to whether or not objects having been recognized in a plurality of consecutive frames correspond to a single subject, as described above. The object correspondence decision-making may be executed by adopting an image recognition technology of the known art. For instance, objects corresponding to a person may be recognized by adopting a face recognition technology or the like of the known art.

In the example presented in FIG. 2B, the object extraction unit 11b determines that the human object OB1 recognized in the frame F14 and the human object OB2 recognized in the frame F16 correspond to one and the same person. Likewise, the object extraction unit 11b determines that the objects OC1, OC2 and OC3, among the objects recognized in the four frames shown in FIG. 2B, correspond to a single subject.

The object extraction unit 11b then extracts the various objects having been recognized in the frames. However, only a single object among the objects recognized in the plurality of frames, will be extracted in correspondence to a single subject based upon the correspondence decision-making results. For instance, the object extraction unit 11b will extract only one object among the objects OC1, OC2 and OC3 recognized in the plurality of frames, as shown in FIG. 2B.

The criterion by which the object extraction unit 11b selects a single object among objects corresponding to the same subject in the embodiment is the order in which the objects appear in the video image file 21. For instance, the image frames selected from the frames constituting the video image file 21 were captured over time in the order of; frame F12, frame F14, frame F16 and frame F19 in the example presented in FIG. 2B. Accordingly, the object appearing first among the objects OC1, OC2 and OC3 corresponding to the same subject is the object OC1 recognized in the frame F14 captured first among the frames constituting the video image file 21. The object extraction unit 11b extracts the object appearing earliest in the video image file among the objects corresponding to the same subject in this manner.

Lastly, the image creation unit 11c creates a single still image composed with the plurality of objects having been extracted by the object extraction unit 11b. FIG. 2C shows an example of a still image that may be created by the image creation unit. The still image P1 in FIG. 2C contains four objects OA1, OB1, OC1 and OD1, extracted by the object extraction unit 11b. These objects are arranged from left to right in the order in which the objects appear in the video image file 21. In addition, a single solid color is set as the background color for the still image P1. This still image P1, created through the object combine processing, is the representative image for the video image file 21.

(Best-Shot Combine Processing)

Figure 3A:
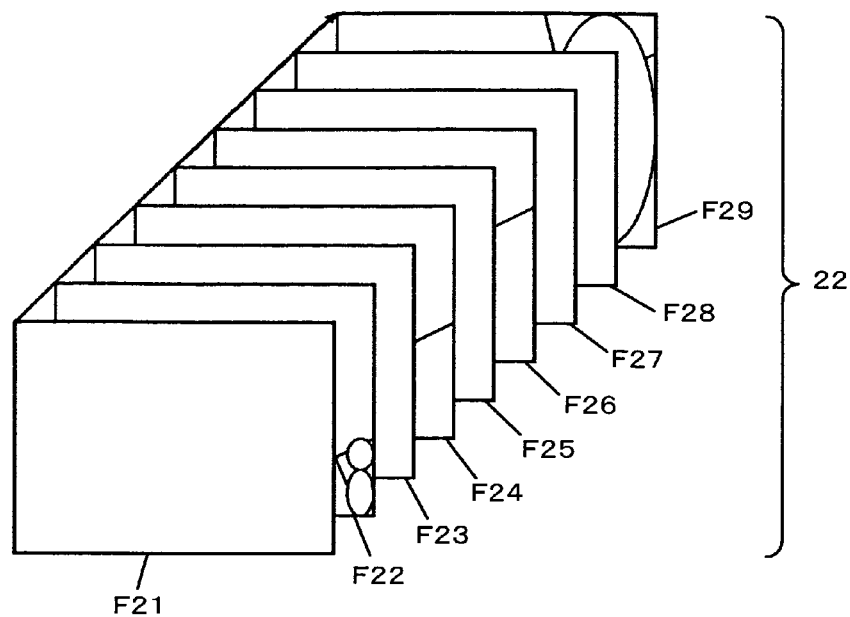
FIGS. 3A to 3C illustrate the procedure through which a thumbnail image is created through best-shot combine processing.
Figure 3B:
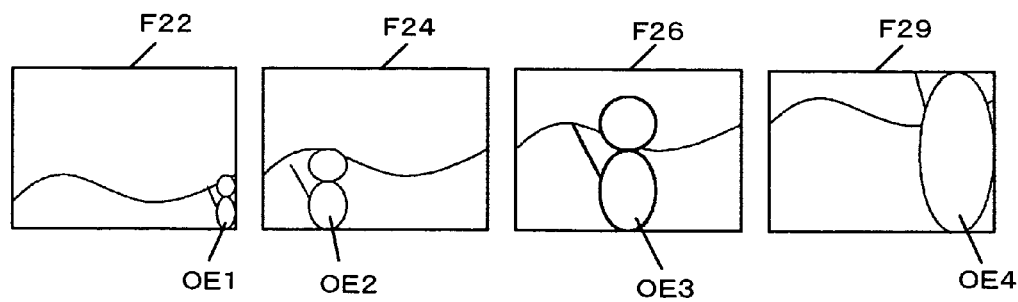
Figure 3C:
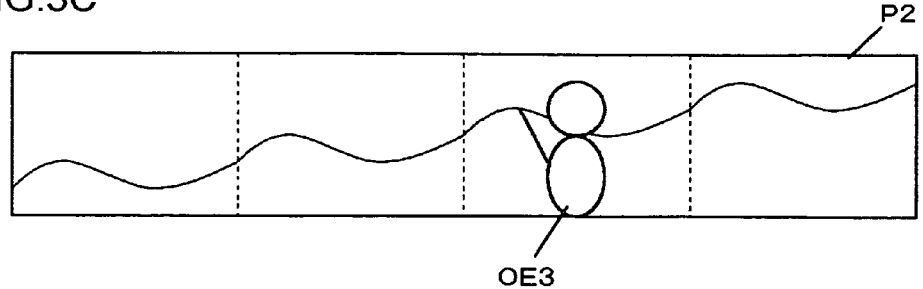

FIGS. 3A to 3C illustrate the procedure through which a representative image is created through the best-shot combine processing. FIG. 3A shows a video image file 22 to undergo the best-shot combine processing described below. The video image file 22 is constituted with a plurality of frames F21 to F29.

In the first half of the best-shot combine processing, frames are selected, objects are recognized and correspondence decision-making is executed, as in the object combine processing. Namely, the frame selection unit 11a first selects processing target frames. The object extraction unit 11b then recognizes objects and makes a decision as to whether or not a plurality of objects correspond to a single subject. It is to be noted that in the best-shot combine processing, the frame selection unit 11a selects frames with which a panoramic image can be created by detecting horizontal displacement of the viewpoint from each frame.

Subsequently, the object extraction unit 11b selects a single subject appearing with the highest frequency, among the subjects corresponding to the recognized objects, as a primary subject in the video image file 22. Then, the object extraction unit 11b selects the object assuming the largest size among the objects corresponding to the primary subject as the primary object. Hereafter, the frame containing the primary object will be referred to as a primary subject best-shot.

The image creation unit 11c creates a panoramic image based upon the plurality of frames having been selected by the frame selection unit 11a as the processing target frames. In addition, it creates a still image P2 that does not contain any object other than the primary object by using the panoramic image as a background for the still image P2 (see FIG. 3C). The still image P2 thus created is the representative image for the video image file 22.

The image creation unit 11c creates the panoramic image by excluding objects other than the primary object as much as possible. For instance, while a video image shot by tracking a moving subject may include a frame containing an image with a background obscured by the subject, the backgrounds of the images contained in the frames preceding and succeeding the particular frame may not be obscured by the subject. Accordingly, the panoramic image to constitute the background of the still image can be created so as not to contain any object other than the primary object by using the preceding or succeeding image.

Figure 4:
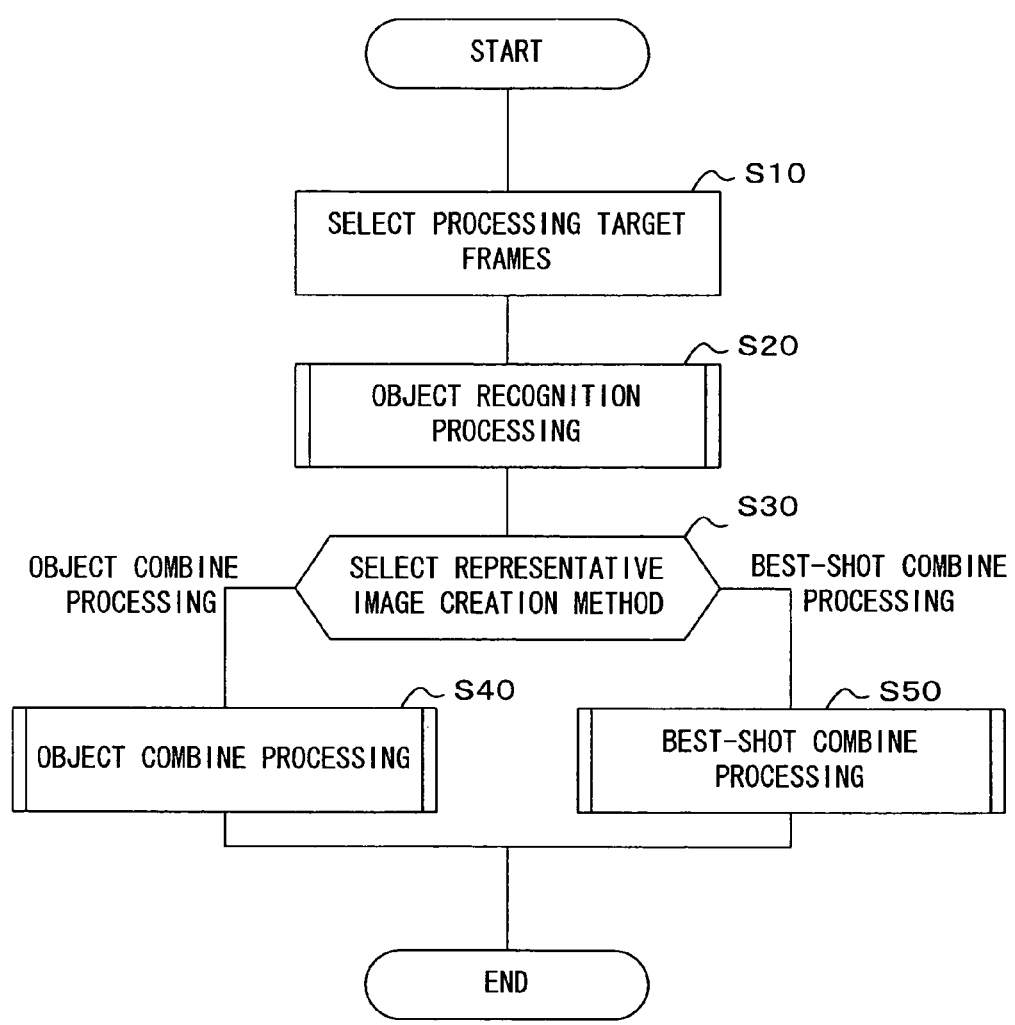
FIG. 4 presents a flowchart of the processing executed to create a representative image based upon a video image file.

FIG. 4 presents a flowchart of the processing executed by the control circuit 11 when creating a representative image for a video image file. The program enabling execution of the processing in this flowchart is stored in the flash memory 12. First, in step S10, the frame selection unit 11a selects target frames to undergo the subsequent processing. In step S20, the object extraction unit 11b executes object recognition processing to be described later. In step S30, the control circuit 11 determines the method to be adopted in the creation of a representative image. For instance, it will be decided that the representative image should be created through the best-shot combine processing if the viewpoint is detected to pan along the horizontal direction in the video image file. Otherwise, it will be determined that the representative image should be created through the object combine processing.

If it is decided by the control circuit 11 in step S30 that the representative image should be created through the object combine processing, the operation proceeds to step S40. In step S40, the object combine processing is executed by the object extraction unit 11b and the image creation unit 11c as detailed later. However, if it is decided by the control circuit 11 in step S30 that the representative image should be created through the best-shot combine processing, the operation proceeds to step S50. In step S50, the best-shot combine processing is executed by the object extraction unit 11b and the image creation unit 11c as detailed later.

Figure 5:
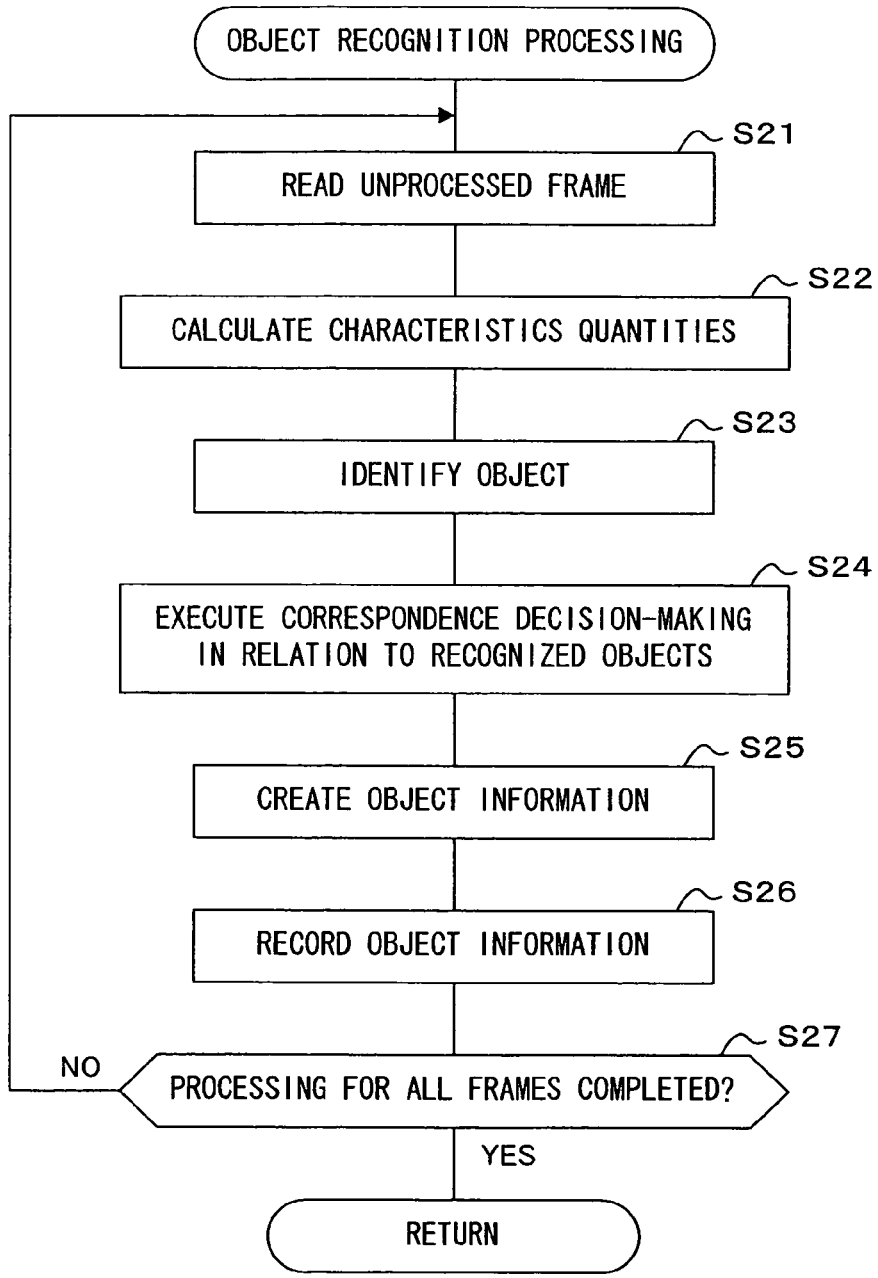
FIG. 5 presents a flowchart of the object recognition processing.

FIG. 5 presents a flowchart of the object recognition processing. This processing is called up in step S20 in the flowchart presented in FIG. 4. In the object recognition processing, objects are recognized in the individual frames selected in step S10 in FIG. 4. In step S21, the object extraction unit 11b reads a frame, which has not yet undergone the processing, among the frames having been selected by the frame selection unit 11a. In step S22, the object extraction unit 11b calculates characteristics quantities that will enable object recognition in the frame read in step S21. In step S23, the object extraction unit 11b recognizes an object in the frame read in step S21. The object recognition is executed based upon the characteristics quantity calculated in step S22.

It is to be noted that the characteristics quantity calculations in step S22 and the object recognition in step S23 are both executed by adopting an image recognition technology of the known art. The image recognition technology of the known art adopted for these purposes may be, for instance, a pattern matching technology. In such a case, in step S22, the object extraction unit 11b calculates a characteristics quantity indicating the level of correlation to the processing target frame in correspondence to each of a plurality of patterns prepared in advance. Then, in step S23, the object extraction unit 11b selects a pattern satisfying a predetermined criterion based upon the characteristics quantity.

In step S24, the object extraction unit 11b executes correspondence decision-making for previously recognized objects and the object most recently recognized in step S23. In step S25, the object extraction unit 11b generates object information based upon the object recognized in step S23. The object information is used when extracting the object. The object information includes an univocal identifier assigned to the particular object alone, information indicating whether or not the object corresponds to a subject represented by a previously recognized object, a rectangular outline circumscribing the object, information indicating the specific frame in which the object has been recognized and the like. In step S26, the object extraction unit 11b records the object information generated in step S25 into the DRAM 13. In step S27, a decision is made as to whether or not the object extraction unit 11b has completed the processing for all the frames having been selected by the frame selection unit 11a. If there is a frame yet to undergo the processing, the operation returns to step S21. However, if it is decided that the processing for all the frames has been completed, the object recognition processing ends.

Figure 6:
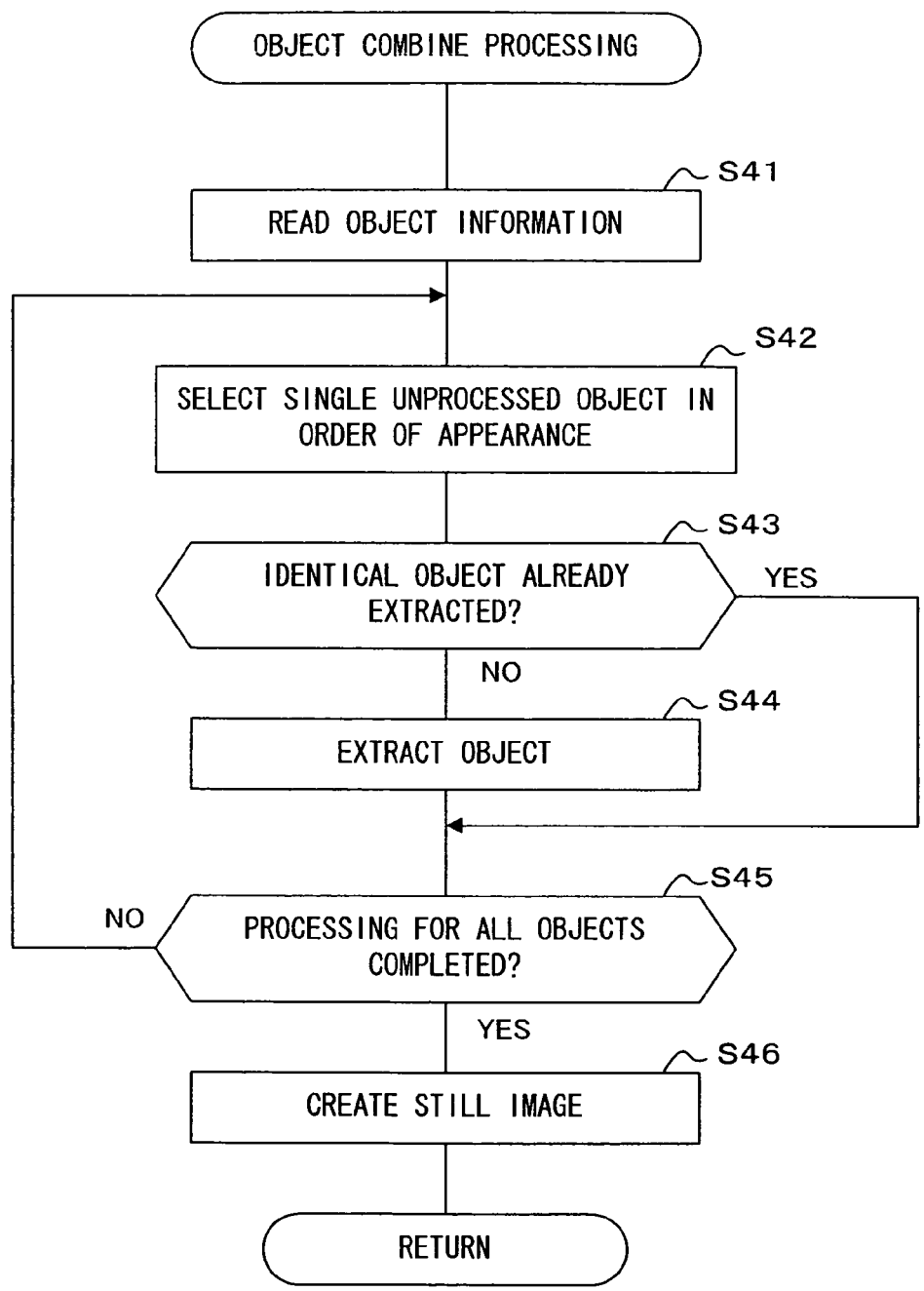
FIG. 6 presents a flowchart of the object combine processing.

FIG. 6 presents a flowchart of the object combine processing. This processing is called up in step S40 in the flowchart presented in FIG. 4. In step S41, the object extraction unit 11b reads all the object information recorded into the DRAM 13 in step S25. In step S42, the object extraction unit 11b selects an earliest-appearing object yet to be processed among all the objects covered by the object information.

In step S43, the object extraction unit 11b checks the object correspondence information in the object information and makes a decision as to whether or not an object corresponding to the same subject as that represented by the object selected in step S42 has already been extracted. If such an object has already been extracted, an affirmative decision is made in step S43 and the operation proceeds to step S45. If, on the other hand, a negative decision is made in step S43, the operation proceeds to step S44. In step S44, the object extraction unit 11b extracts the object from the corresponding frame based upon the object information. In step S45, the object extraction unit 11b makes a decision as to whether or not the processing has been completed for all the objects. If there is any object left unprocessed, a negative decision is made and the operation returns to step S42. However, if an affirmative decision is made in step S45, the operation proceeds to step S46. In step S46, the image creation unit 11c creates a still image containing all the objects extracted in step S44.

Figure 7:
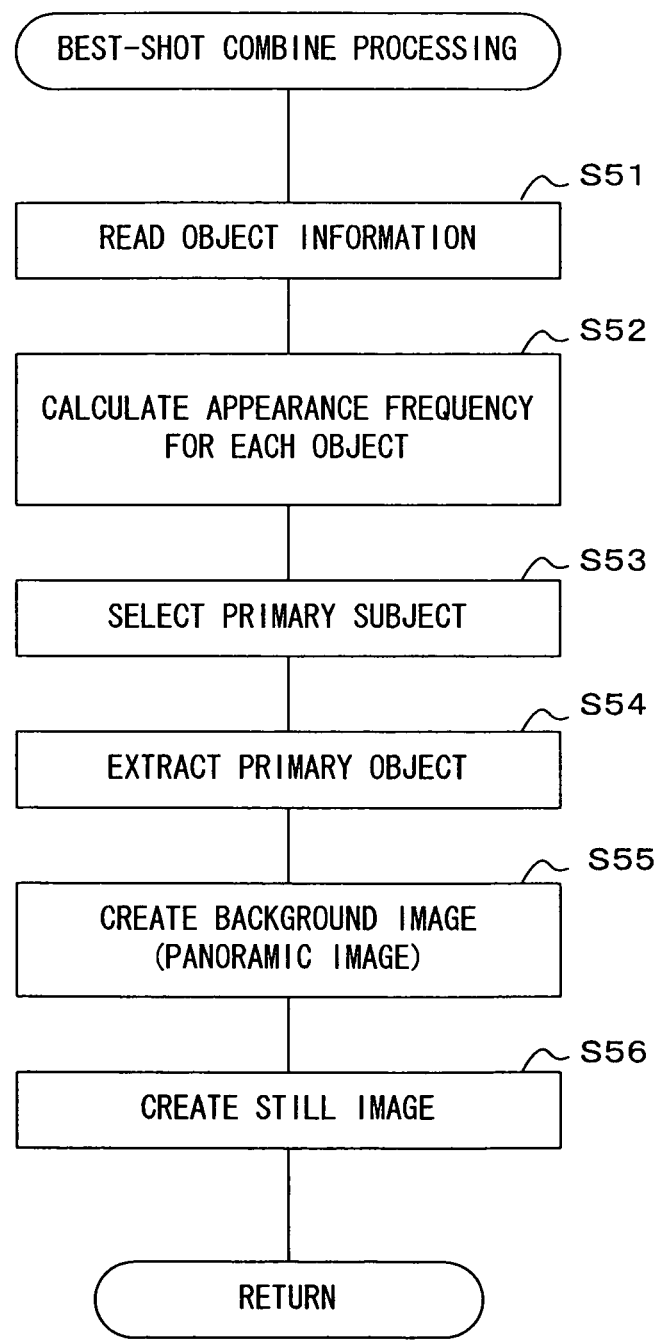
FIG. 7 presents a flowchart of the best-shot combine processing.

FIG. 7 presents a flowchart of the best-shot combine processing. This processing is called up in step S50 in the flowchart presented in FIG. 4. In step S51, the object extraction unit 11b reads all the object information recorded into the DRAM 13 in step S25. In step S52, the object extraction unit 11b calculates or adds up appearance frequency of each object. In step S53, the object extraction unit 11b selects the subject for which the highest level of appearance frequency has been calculated in step S52, i.e., the primary subject. In step S54, the object extraction unit 11b extracts the object assuming the largest size among the objects corresponding to the primary subject, i.e., the primary object, from the corresponding frame based upon the object information. In step S55, the image creation unit 11c creates a panoramic image to be used as the background in the still image that is to be ultimately created. In step S56, the image creation unit 11c creates a still image that does not include any object other than the primary object having been extracted in step S54 by using the panoramic image created in step S55 as the background.

The following advantages are achieved with the image processing apparatus in the first embodiment described above.

(1) The image creation unit 11c creates a still image containing a plurality of objects extracted by the object extraction unit 11b. A single still image thus created allows the user to ascertain the entire contents of the video image file with better accuracy.

(2) If a plurality of objects each recognized in one of a plurality of frames correspond to a single subject, the object extraction unit 11b extracts only one of the plurality of objects. Thus, even when there is a subject that repeatedly appears over a plurality of frames, a still image allowing the user to ascertain the entire contents of the video image file with ease can be created.

(3) The control circuit 11 creates the still image by switching either to the object combine processing or the best-shot combine processing. Thus, an optimal still image best representing the characteristics of the particular video image can be created.

(4) Using a panoramic image for the background of the still image, the image creation unit 11c ensures that no object other than the primary object is contained in the panoramic image. Through these measures, a still image that allows the user to ascertain the primary object with ease is created.

Second Embodiment

Figure 8:
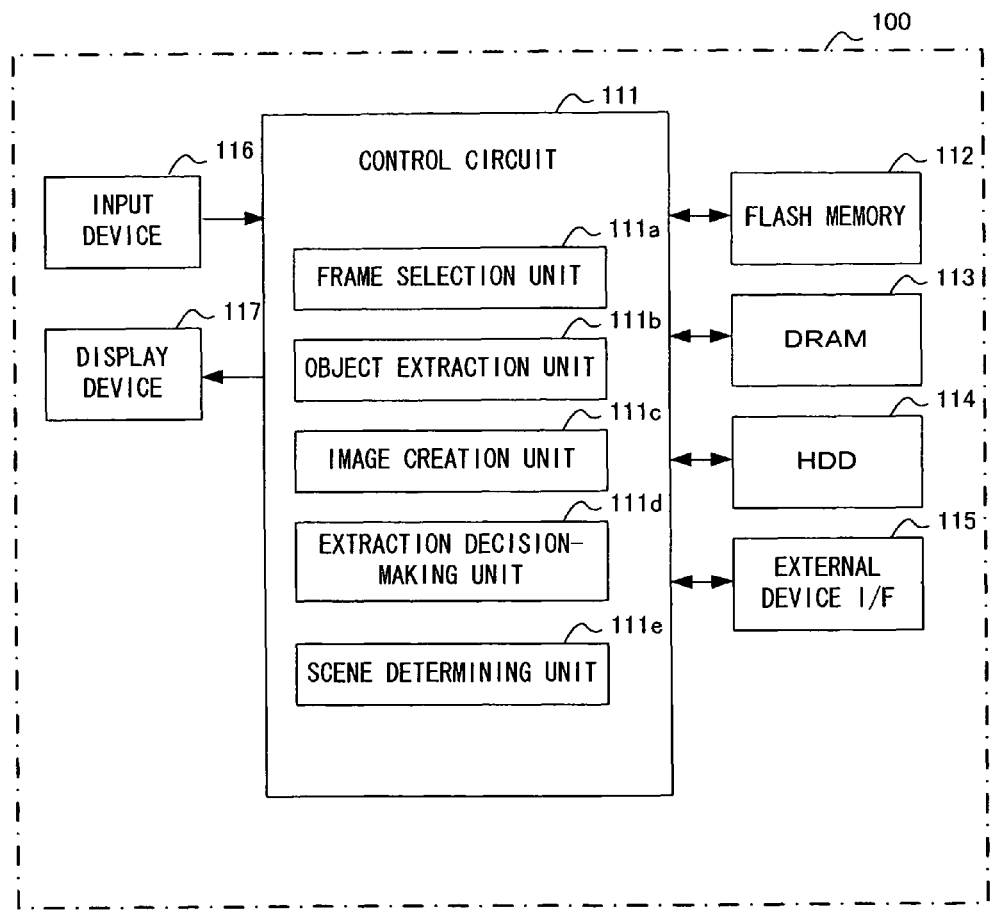
FIG. 8 is a block diagram showing the circuit structure adopted in the image processing apparatus achieved in a second embodiment.

FIG. 8 is a block diagram of the circuit structure adopted in an image processing apparatus 100 achieved in the second embodiment. The image processing apparatus in the second embodiment differs from the image processing apparatus 1 (see FIG. 1) achieved in the first embodiment in that its control circuit 111 further includes an extraction decision-making unit 111d and a scene determining unit 111e. In FIG. 8, elements assuming functions similar to those in the first embodiment are assigned with reference numerals, each greater than the reference numeral assigned to the corresponding element in the first embodiment by 100.

The extraction decision-making unit 111d makes a decision as to whether or not each of the plurality of objects having been recognized by the object extraction unit 111b is to be included in the representative image. If a negative decision is made for a given object by the extraction decision-making unit 111d, the object extraction unit 111b does not extract the particular object. In other words, the still image to be created by the image creation unit 111c will not contain any object for which a negative decision is made by the extraction decision-making unit 111d.

It can be ensured that an object for which a negative decision has been made by the extraction decision-making unit 111d is not included in the still image created by the image creation unit 111c through any of a plurality of methods. For instance, the object extraction unit 111b may be structured so that such an object is not recognized. As an alternative, after various objects are extracted by the object extraction unit 111b, the image creation unit 111c may exclude any such object from the still image it creates.

The scene determining unit 111e determines a scene category for each of the frames selected by the frame selection unit 111a. The scene determining results may indicate, for instance, "landscape", "portrait", "athletic meet", "wedding", "macro" or the like. The scene determining unit 111e may determine a scene category by adopting any of various technologies of the known art. The scene determining results are subsequently used when setting priority rankings, as detailed later.

(Extraction Decision-Making Unit 111d)

The decision-making executed by the extraction decision-making unit 111d is now described in detail. The extraction decision-making unit 111d makes a decision as to whether or not a specific object is to be included in the still image based upon the object shooting duration, the size of the object and the focus level achieved for the object.

The object shooting duration is represented by the total number of frames containing the subject corresponding to the particular object among all the frames constituting the video image file. Td in the following description represents the ratio of the total number of frames containing the object to the number of all the frames in the video image file. The size of the object is indicated by the ratio of the size of the object relative to the size of the entire frame. S in the following description represents the ratio of the size of the object to the size of the frame. The focus level achieved for the object is represented by the total number of frames in which the contrast of the particular object is higher than a reference value, among all the frames constituting the video image file. Tf in the following description represents the ratio of the total number of frames in which the contrast of the object is higher than a reference value to the number of all the frames in the video image file.

The extraction decision-making unit 111d makes a negative decision for any object with the ratios Td, S and Tf thereof each indicating a value less than a predetermined threshold value. It is to be noted that when making a decision in relation to the object size, the object shooting duration may be factored in. For instance, the extraction decision-making unit 111b may decide to include in the still image an object assuming a small size, provided the object shooting duration is significant.

(Setting Priority Rankings)

The object extraction unit 111b in the embodiment sets priority rankings for the plurality of objects having been recognized in the individual frames. The image creation unit 111c creates a still image by arranging the objects at positions determined based upon the priority rankings set by the object extraction unit 111b. The method through which the priority rankings are set is explained next.

The object extraction unit 111b sets a priority ranking for a given object based upon the object shooting duration, the size of the particular object and the focus level achieved for the object. In other words, the object extraction unit 111b determines the priority ranking for the object based upon the ratios Td, S and Tf described earlier. The object extraction unit 111b first calculates a priority factor Pr(n) defined in expression (1) below for each of first through nth objects having been recognized.

$$Pr(n)=(Td(n)\cdot\alpha+S(n)(1-1\alpha))\cdot W(n) \qquad (1)$$

It is to be noted that a in expression (1) is a coefficient used to indicate priority factors in relation to the shooting duration and the areal size, which takes a value equal to or greater than 0 and equal to or less than 1. In addition, W(n) is a weight applied to each object based upon the scene determining results, which takes a value equal to or greater than 0 and equal to or less than 1. The weight W(n) is set by the object extraction unit 111*b* prior to the priority factor calculation. For instance, if the scene determining results indicate "landscape", a greater weight W(n) will be set for an object such as the sky, the ocean, a mountain, a tree, some flowers or a building. However, if the scene determining results indicate "portrait", "athletic meet", "wedding" or the like, a greater weight W(n) will be set for an object representing a human subject compared to the weight applied to another type of object. Namely, the object extraction unit 111*b* sets the weight W(n) in correspondence to specific types of objects based upon the scene determining results. Once priority factors Pr(n) are calculated for all the objects, the object extraction unit 111*b* sets priority rankings by awarding the highest ranking to the object with the highest priority factor Pr(n).

(Object Extraction)

The criterion by which a single object is selected by the object extraction unit 11*b* from a plurality of objects corresponding to a given subject in the first embodiment is the order in which the individual objects appear in the video image file 21. The object extraction unit 111*b* in the present embodiment selects an object among the plurality of objects corresponding to a given subject by adopting a criterion different from that used in the first embodiment.

The object extraction unit 111*b* engaged in object extraction gives priority to an object with numerous parts thereof in focus. The object extraction unit 111*b* also gives priority to an object taking up a greater area relative to the areal size of the entire frame. Furthermore, the object extraction unit 111*b* switches the extraction criteria in correspondence to the types of individual objects.

For instance, in the case of the sky, factors such as the areal size and color are considered more important than the same factors in the case of a human subject or a vehicle subject. Crucial factors with regard to a human subject include whether or not the face is oriented toward the camera, whether or not the entire body is included and whether or not the subject is smiling. Thus, the object extraction unit 111*b* extracts an object by adopting the optimal extraction criterion among different extraction criteria, selected in correspondence to the type of the particular object.

(Image Creation Unit 111*c*)

The image creation unit 111*c* creates a still image based upon the priority rankings having been set for the individual objects as described above.

Figure 9A:
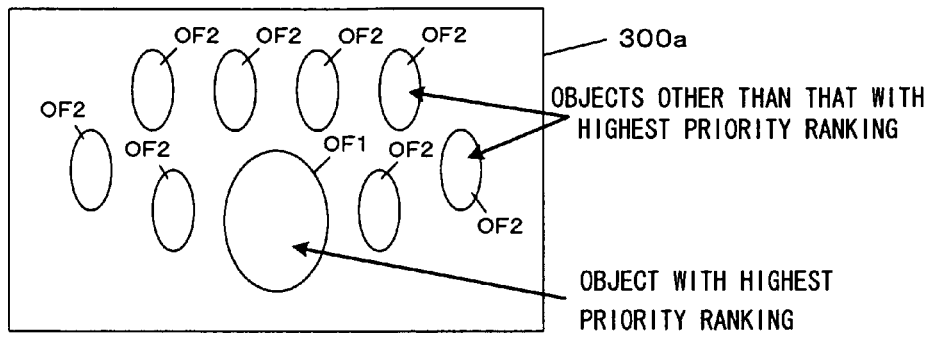
FIGS. 9A to 9C each present an example of a positional arrangement that may be set by the image creation unit when assigning objects to specific positions.
Figure 9B:
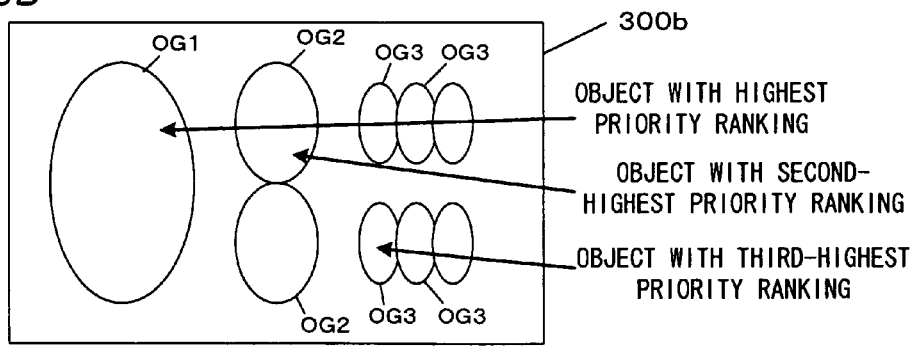
Figure 9C:
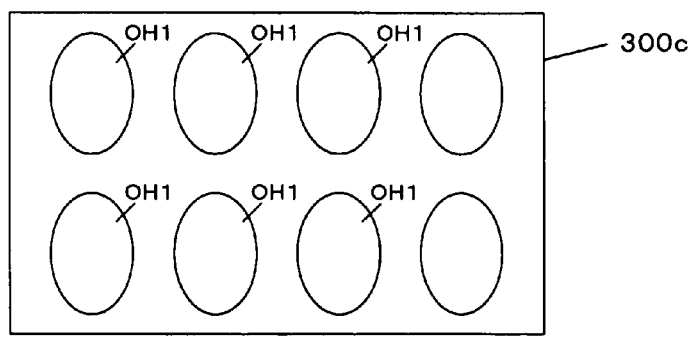

FIGS. 9A to 9C each present an example of an object arrangement with which the image creation unit 111*c* may compose the still image. In the example presented in FIG. 9A, an object OF1 with the highest priority ranking is set at the center of a still image 300*a*, with other objects OF2 set around the object OF1. In addition, the object OF1 takes up a greater area in the still image 300*a* compared to the other objects OF2.

In the example presented in FIG. 9B, objects are set so that the object with the highest priority ranking takes up the leftmost position, the object with the second-highest ranking takes up a position second from the left and so forth. More specifically, an object OG1 with the highest priority ranking is placed on the left side in a still image 300*b*, objects OG2 with the second-highest ranking are set immediately to the right of the object OG1 and objects OG3 with the next highest priority ranking are set to the right of the object OG2. In addition, an object with a higher priority ranking takes up a larger area in the still image 300*b*.

The image creation unit 111*c* creates the still image by switching to the arrangement pattern shown in FIG. 9A or the arrangement pattern shown in FIG. 9B based upon a predetermined criterion. For instance, if there is an object with a markedly higher priority factor than those of the other objects, the still image will be created through the method shown in FIG. 9A, but the still image will be created through the method shown in FIG. 9B otherwise. As an alternative, the user may be allowed to freely select the pattern shown in FIG. 9A or the pattern shown in FIG. 9B.

In addition, if substantially equal priority factors are calculated for the individual objects, the image creation unit 111*c* may create a still image with the arrangement pattern shown in FIG. 9C. In the example presented in FIG. 9C, individual objects OH1 are set over even intervals in a still image 300*c*, with the objects OH taking up equal areas.

Figure 10:
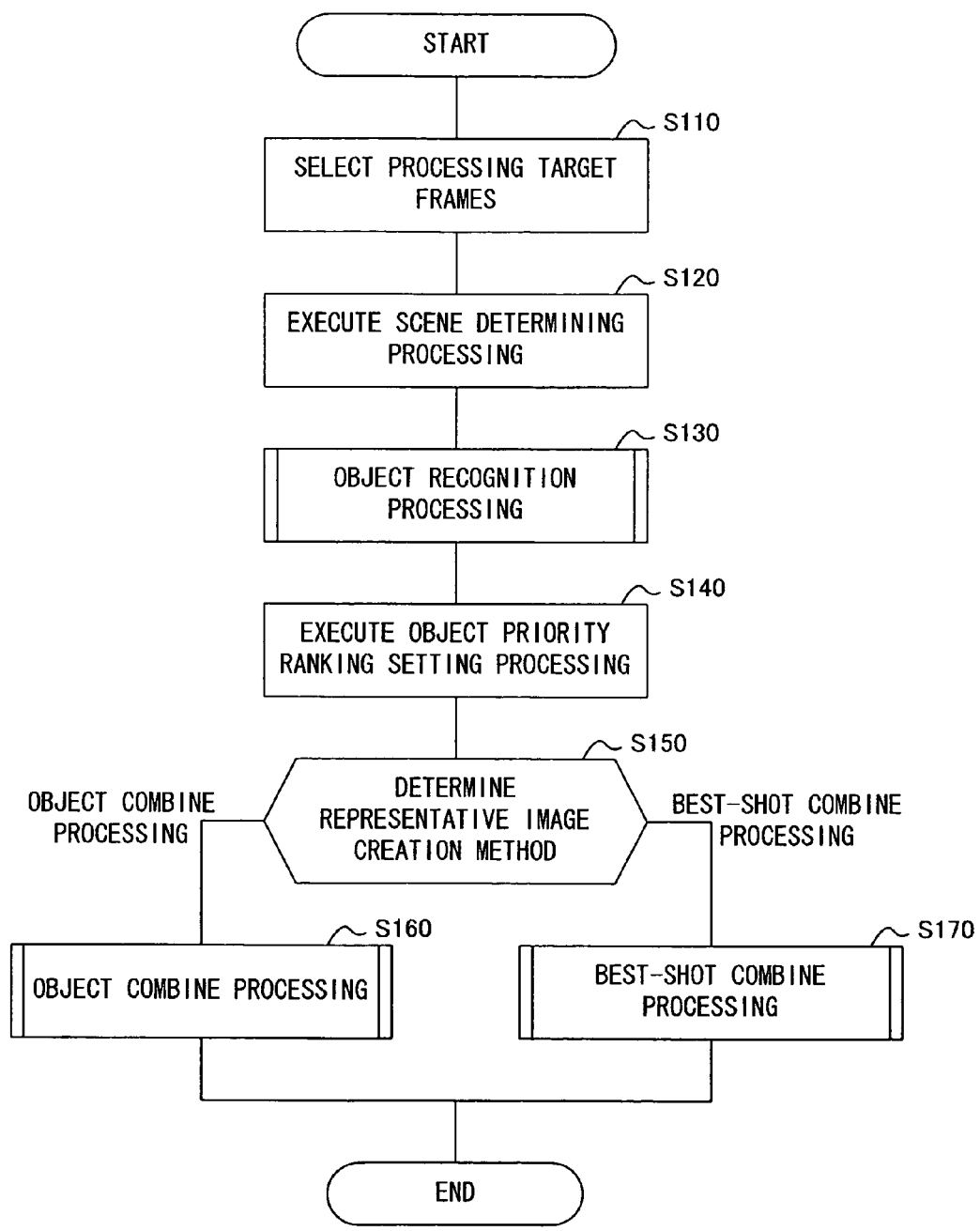
FIG. 10 presents a flowchart of the processing executed by the control circuit when creating a representative image from a video image file.

FIG. 10 presents a flowchart of the processing executed by the control circuit 111 when creating a representative image for a video image file. The program enabling the processing in the flowchart is installed in the flash memory 112. First, in step S110, the frame selection unit 111*a* selects frames to be designated as targets of the subsequent processing. In step S120, the scene determining unit 111*e* executes scene determination processing. In the scene determination processing, the scene category of each of the frames having been selected by the frame selection unit 111*a* is determined by adopting a scene determining technology of the known art. In step S130, the object extraction unit 111*b* executes object recognition processing. In step S140, the object extraction unit 111*b* executes object priority ranking setting processing. Through the object priority ranking setting processing, a priority ranking is set for each object by the specific criteria as described earlier.

In step S150, the control circuit 111 makes a decision with regard to the optimal method to be adopted when creating the representative image. If it is decided in step S150 by the control circuit 111 that the representative image should be created through the object combine processing, the operation proceeds to step S160. In step S160, the object combine processing is executed by the object extraction unit 111*b* and the image creation unit 111*c*. However, if it is decided in step S150 by the control circuit 111 that the representative image should be created through the best-shot combine processing, the operation proceeds to step S170. In step S170, the best-shot combine processing is executed by the object extraction unit 111*b* and the image creation unit 111*c*.

The following advantages are achieved with the image processing apparatus in the second embodiment described above.

(1) The object extraction unit 111*b* sets priority rankings for the plurality of recognized objects. The image creation unit 111*c* then creates a still image containing the plurality of objects by arranging the plurality of objects at positions determined based upon their priority rankings. Through these measures, a still image that allows the user to more accurately ascertain the entire contents of the video image is created.

(2) Based upon the priority ranking awarded to each object, the image creation unit 111*c* determines a relative size of the object in the still image and the position to be taken up by the object in the still image. Thus, the optimal size and the optimal position of the object are determined in correspondence to its priority ranking and a more comprehensible still image is provided.

(3) The extraction decision-making unit 111*d* makes a decision for each of the plurality of objects having been recognized by the object extraction unit 111*b* as to whether or not to include the particular object in the still image. The image creation unit 111c then creates a still image that does not contain any object for which a negative decision has been made by the extraction decision-making unit 111d. As a result, a more comprehensible still image, which does not include any unimportant object, is provided.

(4) The scene determining unit 111e determines a scene category for each of the plurality of frames selected by the frame selection unit 111a. The object extraction unit 111b sets a priority ranking for each of the plurality of objects having been recognized based upon the scene category determined by the scene determining unit 111e in correspondence to the frame in which the particular object has been recognized.

Through these measures, the priority ranking can be set in an optimal manner in correspondence to the scene category.

Third Embodiment

Figure 11:
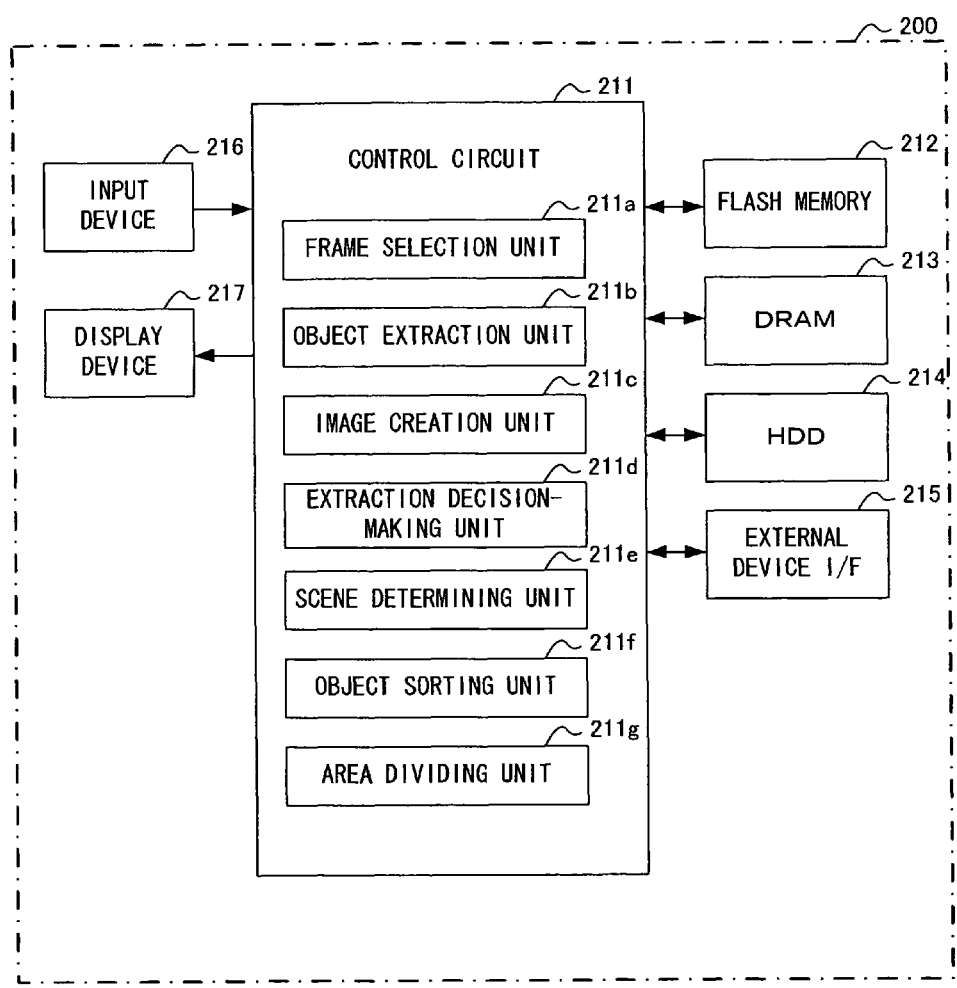
FIG. 11 is a block diagram showing the circuit structure adopted in the image processing apparatus achieved in a third embodiment.

FIG. 11 is a block diagram of the circuit structure adopted in an image processing apparatus 200 achieved in the third embodiment. The image processing apparatus in the third embodiment differs from the image processing apparatus 100 (see FIG. 8) achieved in the second embodiment in that its control circuit 211 further includes an object sorting unit 211f and an area dividing unit 211g. In FIG. 11, elements assuming functions similar to those in the second embodiment are assigned with reference numerals, each greater than the reference numeral assigned to the corresponding element in the second embodiment by 100.

The object sorting unit 211f sorts the plurality of objects having been recognized by the object extraction unit 211b into a plurality of groups. The image creation unit 211c then creates a still image based upon the plurality of groups into which the objects have been sorted. The area dividing unit 211g divides the whole range of the still image into areas each corresponding to one of the plurality of groups. The image creation unit 211c creates the still image by positioning the objects belonging to each of the plurality of groups in the area corresponding to the particular group.

(Object Sorting Unit 211f)

The object sorting unit 211c categorizes the individual objects into a plurality of groups based upon the object types, the position on the time axis of video image, taken up by the frame in which each object has been recognized or scene categories having been determined by the scene determining unit 211e. The user may be allowed to select any criterion for the operation of the object sorting unit 211f, or the object sorting unit 211f may automatically select one of the criteria based upon the characteristics of the video image or the like.

For instance, the object sorting unit 211f may sort objects based upon object types into a human object group, a vehicle object group and a building object group. In such a case, the object sorting unit 211f will form three groups, i.e., a group to which human objects belong, a group to which vehicle objects belong and a group to which building objects belong.

The object sorting unit 211f, sorting objects based upon the position on the time axis of the video image taken up by the frame in which each object has been recognized, may divide the entire video image into segments over predetermined intervals and create groups each corresponding to a given segment. In this case, all the objects contained in the segment will be assigned into a single group. For instance, the object sorting unit 211f may divide a video image with an overall running duration of three minutes over one-minute intervals and thus create three groups, i.e., a group extending from the beginning to the one-minute point, a group extending from the one-minute point to the two-minute point and a group extending from the two-minute point to the end.

The object sorting unit 211f, sorting objects based upon scene categories determined by the scene determining unit 211e, may detect a scene change through the video image. It will then create a group in correspondence to the time segment through which a given scene runs and will assign all the objects contained in the particular segment into the group.

(Area Dividing Unit 211g)

Figure 12:
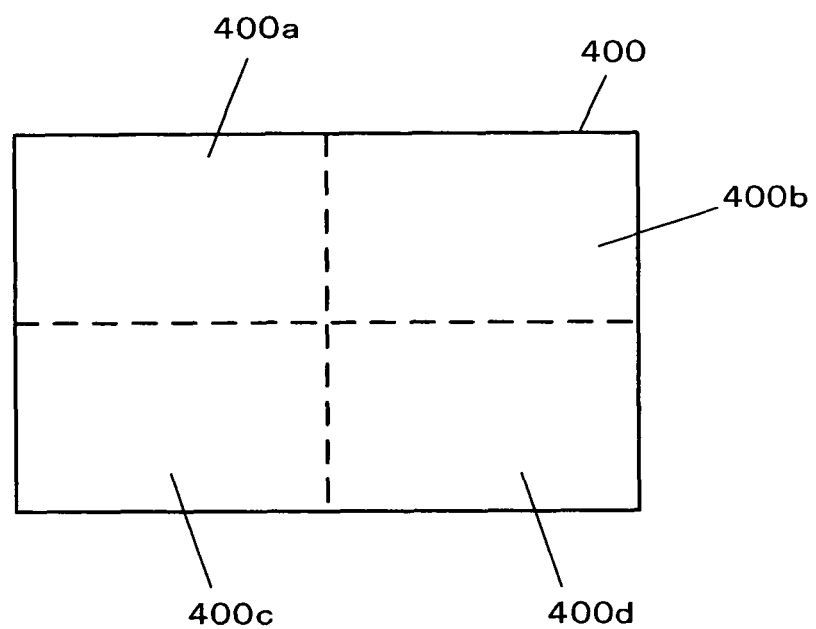
FIG. 12 illustrates how an area may be divided into smaller parts by the area dividing unit.

FIG. 12 illustrates how a still image may be divided into smaller areas by the area dividing unit 211g. The area dividing unit 211g divides the whole range of the still image into areas each corresponding to one of the plurality of groups. In the example presented in FIG. 12, a still image 400 is divided into four separate areas 400a, 400b, 400c and 400d. The image creation unit 211c positions objects having been sorted into a given group within one of these separate areas. For instance, the object having been sorted into the first group may be set in the area 400a and the object having been categorized into the second group may be set in the area 400b. The criterion by which the objects are arranged within each area by the image creation unit 211c is selected as in the second embodiment.

The following advantages are achieved with the image processing apparatus in the third embodiment described above.

(1) The object sorting unit 211f sorts the plurality of objects having been recognized by the object extraction unit 211b into a plurality of groups. The image creation unit 211c then creates a still image based upon the plurality of groups into which the objects have been sorted. Through these measures, a more comprehensible still image can be created.

(2) The area dividing unit 211g divides the whole range of the still image into areas each corresponding to one of the plurality of groups. The image creation unit 211c positions the objects belonging to each of the plurality of groups within the area corresponding to the particular group. As a result, the individual objects can be arranged within the single still image in a more meaningful manner.

The present invention allows for the following variations thereof without departing from the scope of the invention, and one of the variations or a plurality of the variations may be adopted in combination with any of the embodiments described above.

(Variation 1)

The representative image may be created when bringing up the thumbnail display or when the video image file is created. A video camera, for instance, may be assigned with the execution of the representative image creation processing described above. In addition, the representative image having been created may be recorded into a recording medium as an image file correlated to the video image file.

(Variation 2)

While the representative image is created by switching to one of the two specific types of processing, i.e., the object combine processing and the best-shot combine processing, in the embodiments described above, the image processing apparatus may be configured so as to create the representative image only through either one of the two types of processing alone.

(Variation 3)

When the object extraction unit 11b recognizes objects in a quantity greater than a predetermined value, only some of the objects may be extracted. For instance, the object extraction unit may extract only objects assuming sizes equal to or greater than a predetermined size or a limited number of objects may be extracted based upon the object types or the object shapes. In addition, a face recognition technology may be adopted so as to extract an object representing a specific person alone. As a further alternative, a list of objects may be brought up on display so as to allow the user to select objects to be extracted.

(Variation 4)

The criterion by which an object is selected among objects corresponding to a single subject does not need to be the order in which the objects appear. For instance, the object taking up the largest areal range may be selected or the object achieving the highest contrast may be selected. As an alternative, an object may be selected based upon characteristics quantities calculated by executing a specific type of image processing.

(Variation 5)

The plurality of objects may be set in the still image through a method other than that whereby the objects are arranged from left to right in the order in which the objects appear. The plurality of objects may be, for instance, set randomly through the entire still image. In addition, when there are numerous objects, some of or all of the objects may be reduced in size so as to contain them all in the still image. Alternatively, when there are numerous objects, the size of the still image may be increased.

(Variation 6)

The manner in which the object combine processing and the best-shot combine processing are switched from one to another is not limited to that having been described in reference to the embodiments. For instance, the user may manually select either type of processing, or the object combine processing may be selected whenever the number of objects appearing in the video image file is greater than a predetermined value.

(Variation 7)

The still image created by the image creation unit 11c through the object combine processing may include a background. For instance, the background of the image in one of the frames having been selected by the frame selection unit 11a may be used or a predetermined background image may be used.

(Variation 8)

The primary subject and the primary object may be selected through a method other than that having been described in reference to the embodiments. For instance, the frame from which an edge of highest intensity has been detected may be designated as the best-shot and an object contained in this frame may be designated as the primary object.

(Variation 9)

A plurality of still images may be created based upon a single video image. In addition, a still image created by stringing together these still images longitudinally or laterally may be used as a representative image. For instance, instead of positioning the objects belonging to each group within one of the plurality of areas into which the still image has been divided by the area dividing unit 211g, the image creation unit 211c in the third embodiment may create a plurality of still images each in correspondence to one of the groups.

(Variation 10)

The criteria by which the extraction decision-making unit 111d makes the decision as to whether or not to include a given object in the still image are not limited to those having been described in reference to the embodiments. For instance, the user may select an object to be included in the still image by operating the input device 116. In such a case, the extraction decision-making unit 111d will make an affirmative decision for the object selected by the user but will make a negative decision for any object that has not been selected by the user. As an alternative, the user may pre-register a specific human subject and the extraction decision-making unit 111d may make a decision to include the particular human subject alone in the still image by adopting a face recognition technology of the known art. As a further alternative, the user may preselect a specific object type (human, vehicle, sky or the like) and in such a case, the extraction decision-making unit 111d will make a decision to include the specific type of objects alone in the still image.

(Variation 11)

Figure 13:
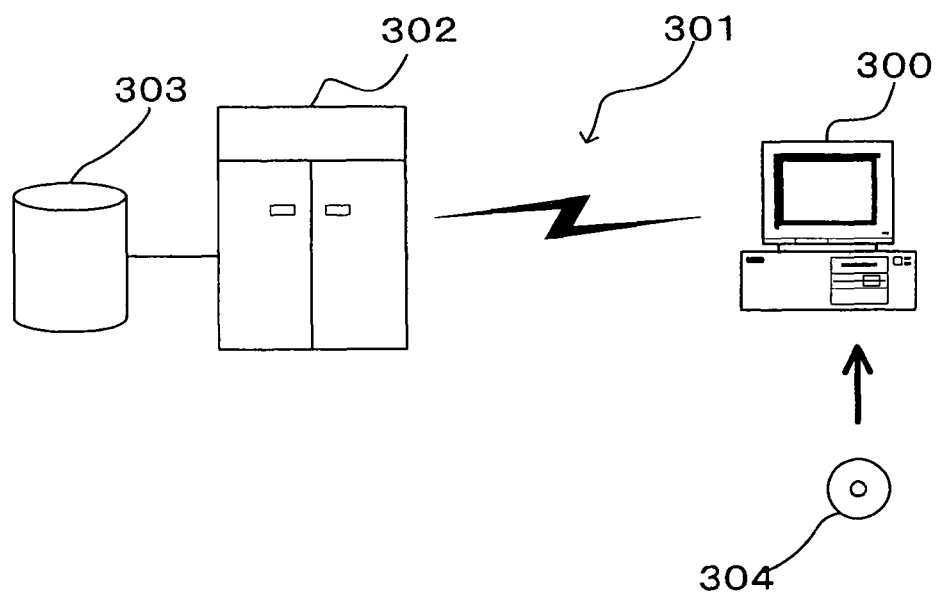
FIG. 13 illustrates how the program may be provided.

Moreover, the image processing apparatus described above may be adopted in a personal computer or the like, and in such a case, the program enabling the control described above can be provided in a recording medium such as a CD-ROM or through data signals on the Internet or the like. FIG. 13 illustrates how the program may be provided. A personal computer 300 receives the program via a CD-ROM 304. In addition, the personal computer 300 is capable of connecting with a communication line 301. A computer 302 is a server computer that provides the program stored in a recording medium such as a hard disk 303. The communication line 301 may be a communication network such as the Internet or a personal computer communication network or it may be a dedicated communication line. The computer 302 transmits the program read out from the hard disk 303 to the personal computer 300 via the communication line 301. Namely, the program embodied as a data signal on a carrier wave is transmitted via the communication line 301. In other words, the program can be provided as a computer-readable computer program product assuming any of various modes including a non-transitory recording medium and a carrier wave.

The above described embodiments are examples and various modifications can be made without departing from the scope of the invention.

What is claimed is:

1. An image processing apparatus, comprising:
   a selection device that selects a plurality of frames from a video image constituted with a group of frames;
   an extraction device that recognizes a specific subject image in the plurality of frames having been selected and extracts the recognized subject image;
   a scene determining device that determines a scene category for each of the plurality of frames having been selected;
   a priority ranking setting device that sets priority rankings for a plurality of subject images having been recognized by the extraction device, based upon the scene category determined by the scene determining device in correspondence to a frame in which the subject image has been recognized, the scene category including at least one of landscape, portrait, athletic meet, wedding and macro; and
   an image creation device that creates a background still image based upon at least one of the frames selected by the selection device, and creates a still image by combining the background still image and a plurality of subject images having been extracted by the extraction device, the plurality of extracted subject images having been arranged at positions determined based upon the priority rankings.

2. The image processing apparatus according to claim 1, wherein:
   the background still image is a panoramic image created based upon the plurality of frames selected by the selection device.

3. The image processing apparatus according to claim 1, wherein:

the image creation device determines at least one of a relative size to be assumed by each subject image within the still image and a position at which the subject image is to be set within the still image based upon the priority rankings.

4. The image processing apparatus according to claim 1, further comprising:
a decision device that makes a decision for each of a plurality of subject images having been recognized by the extraction device as to whether or not the subject image is to be included in the still image, wherein:
the image creation device creates the still image that does not contain any subject image for which a negative decision has been made by the decision device.

5. The image processing apparatus according to claim 4, wherein:
the decision device makes a decision for each of the plurality of subject images having been recognized by the extraction device as to whether or not to include the subject image in the still image based upon at least one of: (i) a number of scenes containing images of a common subject identical to the subject of the subject image, (ii) a size of the subject image, and (iii) a focus level achieved for the subject image.

6. The image processing apparatus according to claim 1, wherein:
if the plurality of subject images having been recognized in the plurality of frames by the extraction device are images of a single subject, the image creation device includes only one of the plurality of subject images in the still image.

7. The image processing apparatus according to claim 6, wherein:
the priority ranking setting device sets the priority rankings for each of the plurality of subject images having been recognized by the extraction device based upon at least one of: (i) a number of scenes containing images of a common subject identical to the subject of the subject image, (ii) a size of the subject image, and (iii) a focus level achieved for the subject image.

8. The image processing apparatus according to claim 1, further comprising:
a categorization device that categorizes the plurality of subject images having been recognized by the extraction device, into a plurality of groups, wherein:
the image creation device creates the still image based upon the plurality of groups into which the plurality of subject images have been categorized.

9. The image processing apparatus according to claim 8, further comprising:
an area dividing device that divides an entire area of the still image into areas each corresponding to one of the plurality of groups, wherein:
the image creation device creates the still image by setting subject images belonging to each of the plurality of groups in an area corresponding to the group.

10. The image processing apparatus according to claim 8, wherein:
the image creation device creates a plurality of still images each in correspondence to one of the plurality of groups.

11. The image processing apparatus according to claim 8, wherein:
the categorization device categorizes the plurality of subject images having been recognized by the extraction device, into the plurality of groups based upon at least one of: a type of each subject image, a position of a frame in which the subject image has been recognized, assumed on a time axis of the video image, and the scene category determined for the frame by the scene determining device.

12. A non-transitory computer-readable computer program product that includes an image processing program, with the image processing program comprising:
a selection step in which a plurality of frames are selected from a video image constituted with a group of frames;
a scene determining step in which a scene category is determined for each of the plurality of frames having been selected;
an extraction step in which a specific subject image is recognized in the plurality of frames having been selected and the recognized specific subject image is extracted;
a priority ranking setting step in which priority rankings are set for a plurality of subject images having been extracted through the extraction step, based upon the scene category determined by the scene determining step in correspondence to a frame in which the subject image has been recognized, the scene category including at least one of landscape, portrait, athletic meet, wedding and macro; and
an image creation step in which a background still image is created based upon at least one of the frames selected by the selection step, and a still image is created by combining the background still image and the plurality of subject images having been extracted by the extraction step, the plurality of extracted subject images having been arranged at positions based upon the priority rankings.

13. The non-transitory computer-readable computer program product according to claim 12, wherein:
the background still image is a panoramic image created based upon the plurality of frames selected by the selection step.

14. An image processing apparatus, comprising:
a selection device that selects a plurality of frames from a video image constituted with a group of frames;
an extraction device that recognizes a specific subject image in the plurality of frames having been selected and extracts the recognized subject image;
a priority ranking setting device that sets priority rankings for a plurality of subject images having been recognized by the extraction device, based upon a focus level achieved for each subject image; and
an image creation device that creates a background still image based upon at least one of the frames selected by the selection device, and creates a still image by combining the background still image and a plurality of subject images having been extracted by the extraction device, the plurality of extracted subject images having been arranged at positions determined based upon the priority rankings.

15. A non-transitory computer readable computer program product that includes an image processing program, with the image processing program comprising:
a selection step in which a plurality of frames are selected from a video image constituted with a group of frames;
an extraction step in which a specific subject image is recognized in the plurality of frames having been selected and the recognized specific subject image is extracted;
a priority ranking setting step in which priority rankings are set for a plurality of subject images having been extracted through the extraction step, based upon a focus level achieved for each subject image; and an image creation step in which a background still image is created based upon at least one of the frames selected by the selection step, and a still image is created by combining the background still image and a plurality of subject images having been extracted by the extraction step, the plurality of extracted subject images having been arranged at positions based upon the priority rankings.

* * * * *